INVENTOR
HENRY P. SANDORE, JR.
ATTORNEYS

United States Patent Office 3,505,525
Patented Apr. 7, 1970

3,505,525
RADIATION-SHIELDING WINDOW CONTAINING SILICONE OILS BETWEEN FACING SHEETS
Henry P. Sandore, Jr., Elmira, N.Y., assignor to Corning Glass Works, Corning, N.Y., a corporation of New York
Filed Jan. 25, 1966, Ser. No. 522,981
Int. Cl. G21f *1/00, 3/00*
U.S. Cl. 250—108                                    10 Claims

ABSTRACT OF THE DISCLOSURE

A radiation-shielding window structure comprising a number of plates of transparent radiation-resistant glass in face-to-face relationship having a thin film of a silicone oil filling the space between the surfaces of adjacent glass sheets is described. The silicone oil is preferably a phenyl-methyl or a methyl silicone oil.

---

Figure 1:
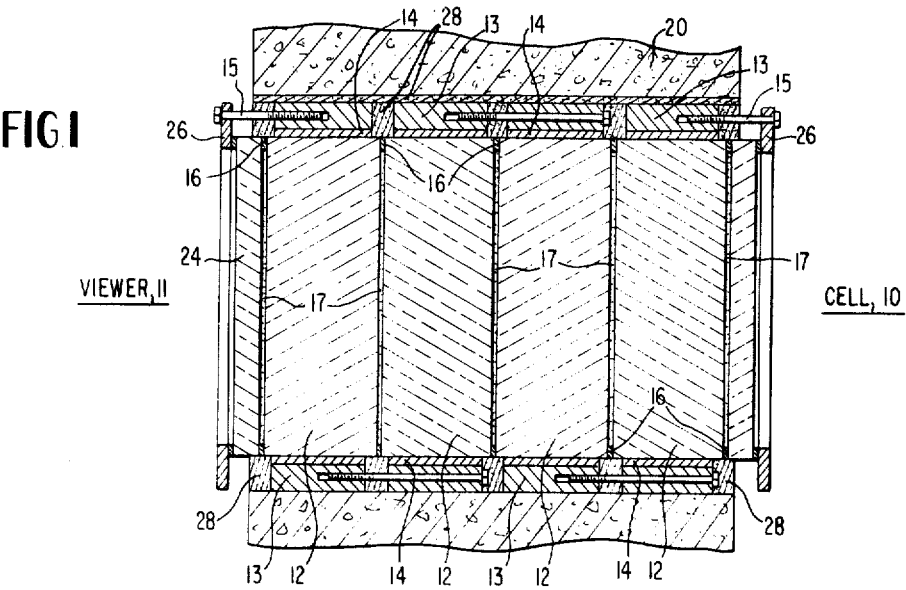

The present invention relates to laminated radiation-shielding window structures.

The most widely employed radiation-shielding window structure in current use is of the oil-filled variety. This window comprises a plurality of glass plates in face-to-face alignment, separated one from the other by a substantial void which is filled with a radiation absorbing oil. With the advent of more powerful radiation sources, certain drawbacks have been found to reside in the use of such viewing structures. In particular, deterioration of the oil leads to expensive and time consuming maintenance problems.

Upon exposure to radiation dosages in the range of $10^6$ rads, the conventional windows are characterized by deterioration of the oil filling. This leaves deposits on the glass surfaces that cannot be removed by flushing with oil or chemicals. The deposits can only be removed by disassembling the window and thoroughly cleaning all component parts. In most cases, before this can be done, the operation in the cell must be re-scheduled and the cell decontaminated to reduce the radiation to a safe level so that maintenance personnel may attend to the cleaning. This, of course, is a very expensive operation.

In addition, oil-filled windows are subject to boiling of the oil when exposed to high dosages of radiations. They also exhibit clouding due to moisture in the oil or temperatures below about 35° F. The occurrence of oil leaks at joints and gaskets between the glass panels is another common problem.

Therefore, the present invention is concerned with providing a radiation-shielding window which may be subjected to radiation dosages in the range of $10^8$ rads and above without deterioration and without exhibiting the drawbacks and disadvantages common to conventional oil-filled windows.

In general, the objectives of the present invention are achieved by a radiation shielding window comprising a plurality of radiation resistant, transparent glass panels in face-to-face relationship and separated one from the other by a thin film of a silicone resin.

The silicone resins suitable in the present invention have the following characteristics:

(a) Index of refraction—1.47 to 1.59 at room temperature.
(b) Linear expansion coefficient—.13 × 10⁻⁴ to 6.8 × 10⁻⁴ c. from −25° C. to 100° C.
(c) Radiation stability up to $10^8$ rads of cobalt 60 and an absorption coefficient that does not increase more than 300%.
(d) Viscosity —0.5 to 50 poises at 25° C.

The silicone material must also be compatible with the radiation resistant, transparent glass panels with which it is laminated. The silicone must not react with lead silicates for relatively long periods, i.e., for about five years. The silicone fluid must wet the surface of the radiation resistant glass panels.

In particular, it has been found that phenylmethyl and methyl silicone oils are excellent materials for use in radiation-shielding windows of the present invention. The silicone oils have the following general formula:

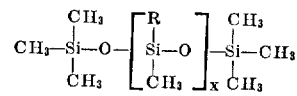

where R is a methyl or phenyl group. Where X is equal to one, the oils have a viscosity of about .65 cs. At viscosities of 2.6 cs. and 74,600 cs. the molecular weights of the oils are 458 and 148,000 respectively.

Examples of suitable silicone oils for use in the invention are Dow Corning 200 Silicone fluid, and Dow Corning 510 Silicone fluid.

Figure 2:
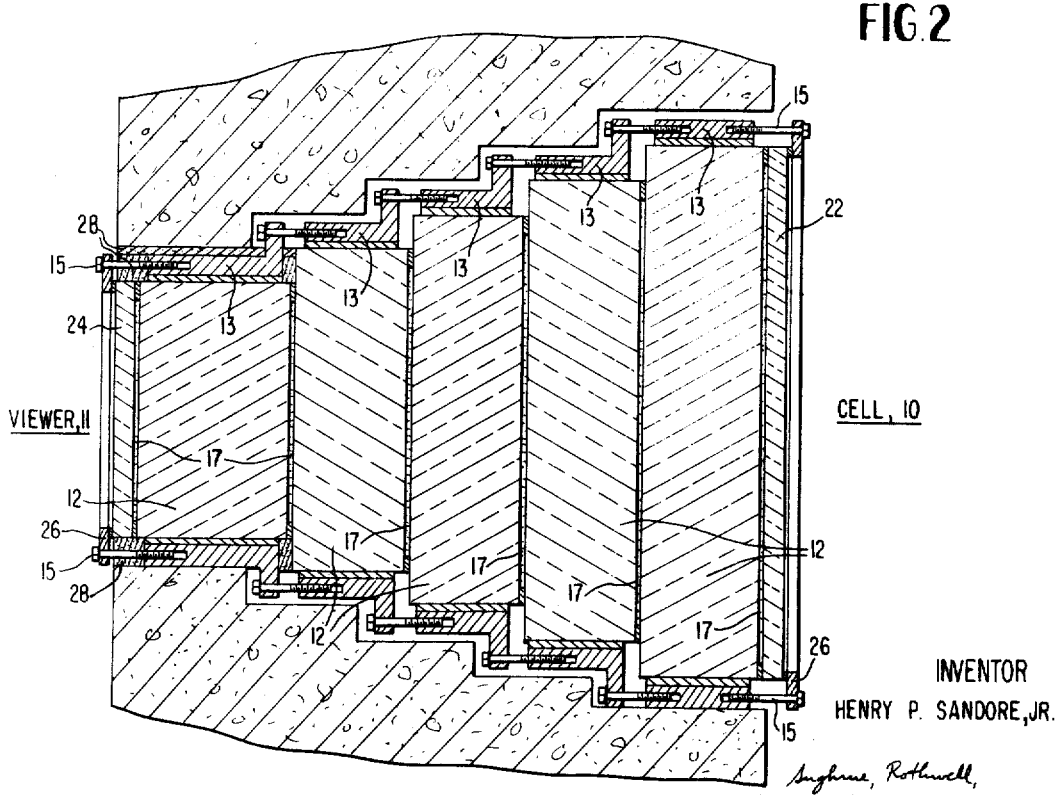

The invention will be more fully appreciated in light of the following detailed description of certain preferred embodiments for carrying out the invention. An appreciation of the invention will also be aided by reference to the accompanying drawing in which:

FIGURE 1 is a side sectional view of a "straight-through" radiation-shielding window in accordance with the invention; and FIGURE 2 is a side sectional view of a "stepped" radiation-shielding window in accordance with the invention.

As the radiation-shielding windows illustrated in FIGURES 1 and 2 are viewed, the radiation producing source or cell 10 is located on the right and the viewer 11 is positioned on the left.

Referring specifically to FIGURE 1, the "straight-through" window shown is employed where the field to be viewed is relatively narrow or can be located directly in front of the window. This is frequently the case in hospital applications where a patient and a radiation source may be positioned directly in line with the viewer.

A radiation-shielding window is ordinarily mounted in a heavy masonry structure 20 which may have radiation shielding elements, such as lead sheets, embedded in it. The window itself comprises a plurality of plates 12 of radiation resistant glass. Useful glasses include, for example, lead borosilicate, potash lead silicate and potash barium silicate.

The edges of the glass plates are surrounded by metal frames 13, which may be of steel. The frames are bonded to the edges of the glass plates by a fusible alloy 14, a bonding agent impregnated with lead dust or by other suitable metal. The metal frames 13 are provided with apertures and threaded recesses so that adjacent plates may be clamped together by bolts 15.

A thin film 17 of a silicone material, preferably a methyl or phenyl-methyl siloxane, as described more fully above, is pressed between adjacent glass plates 12 and held in place by gaskets 16 which border the peripheries of the glass plates. The gasket may be made of polyurethane (Estane), Mylar Silastic 81 sheet, or any other suitable material. Cover plates 22 and 24 are bonded to the outer surfaces of the exterior glass plates by the same silicone interlayer 17 as between plates 12. The cover plates 22 and 24 are also clamped to the assembly by bolted cover bracket 26. Sheets of lead 28 or lead wool may be positioned in the aperture in structure 20 to fill the space between the window and structure 20. Lead is used across the top and down the sides for shielding.

Referring now to FIGURE 2, the radiation shielding window is of general similar structure to that of FIGURE 1, but it has a stepped configuration, so that the viewer may observe a wider field in the cell area 10. This is important where a relatively large area is to be viewed and results in a substantial saving in the amount of materials which must be employed to provide a sufficiently wide field of vision.

Again, the structure comprises a series of plates 12 of radiation resistant glass to the edges of which are bonded metal frames 13 by means of a fusible alloy 14, such as one of the Cerro alloys, or other suitable bonding material. Except for the largest, frames 13 have an L-shaped configuration and are provided with threaded recesses and apertures so that the successive plates may be bonded or clamped one to the other by bolts 15. Films of radiation resistant silicone material 17 are pressed between adjacent plates 12 and held in place by gaskets 16. Glass cover plates 22 and 24 are clamped to the outer and inner plates of radiation resistant glass by means of brackets 26. As before, sheets of lead shielding material 28 may be interposed between the window and the structure 20 in which the window is positioned. In the case of a stepped structure, shielding material 28 may be limited to the first step or section on the viewer's side 11.

In preparing a window in accordance with the present invention, a cover plate of radiation resistant potash barium silicate glass having a thickness of 1½ inches, is ground and polished to within a few thousandths of an inch tolerance on a Blanchard grinder. The plate is mounted in a metal frame. A suitable gasket is provided around the edges of the glass plate to confine the silicone material during pouring. A second sheet of similarly ground potash lead silicate glass is placed in face-to-face relationship with the first, spaced from it by the gasket. The assembly is clamped by bolting the frames together and silicone is then poured in between. Dow Corning Silastic 63471, a cast-in-place methyl silicone is employed. One part catalyst is mixed with ten parts of the silicone and the mixture is poured between the plates. The methyl silicone oil sets up and is allowed to stand for 24 hours.

Additional plates are then added to the assembly in the same manner to complete the window. Plates near the viewing side may be of lead borosilicate, while plates near the "hot" or cell side may be of potash lead silicate glass.

Silicone materials that have been found to be satisfactory include, for example, soft, rubbery methyl siloxanes, such as Dow Corning 200 Silicone Fluid having a viscosity of 50 centistokes and Dow Corning 510 Silicone Fluid having a viscosity of 100 centistokes. Polydimethyl siloxanes having viscosities below 200 centistokes are also satisfactory. Other useful methyl or phenyl silicone oils include Sylgard 182 and Dow Corning Silastic 63471, cast-in-place plastic.

It will be apparent to those skilled in the art that various modifications may be made in the window structures, illustratively described above, without departing from the spirit or scope of the invention as expressed in the following claims.

What is claimed is:
1. A radiation shielding window structure comprising a plurality of plates of transparent radiation resistant glass in face-to-face relationship and, interposed between and filling the space between the facing surfaces of adjacent plates of said glass, a thin film of a silicone oil selected from the group consisting of phenylmethyl silicone oils and methyl silicone oils.

2. The window structure of claim 1 wherein said silicone oil is a methyl silicone oil.

3. The window structure of claim 1 wherein said silicone oil is a phenylmethyl silicone oil.

4. The window structure of claim 1 wherein said glass plates are composed of radiation shielding glass containing lead.

5. The window structure of claim 1 further comprising clamping means for pressing said adjacent glass plates together against said interposed film.

6. The window structure of claim 1 further comprising gasket means between said adjacent plates for confining said film between said plates.

7. The window structure of claim 1 wherein the area of said plates is incrementally increased from the viewer's side to the cell side of said structure.

8. The window structure of claim 7 wherein said glass plates are composed of a radiation shielding glass containing lead.

9. The window structure of claim 7 further comprising clamping means for pressing said adjacent glass plates together against said interposed film.

10. The window structure of claim 7 further comprising gasket means between said adjacent plates for confining said film between said plates.

References Cited

UNITED STATES PATENTS

| 2,957,210 | 10/1960 | Levenson. | |
| 3,125,634 | 3/1964 | Murray et al. | 260—448.2 X |
| 3,142,649 | 7/1964 | Blanco | 252—478 |
| 3,197,641 | 7/1965 | Larkin. | |
| 3,283,156 | 11/1966 | Mazza. | |

RALPH G. NILSON, Primary Examiner

S. ELBAUM, Assistant Examiner

U.S. Cl. X.R.

252—478; 260—448.2